US008090902B1

(12) United States Patent
Bennett et al.

(10) Patent No.: US 8,090,902 B1
(45) Date of Patent: Jan. 3, 2012

(54) DISK DRIVE ADJUSTING COMMAND EXECUTION IN RESPONSE TO CONTROL CIRCUITRY DIE TEMPERATURE

(75) Inventors: George J. Bennett, Murrieta, CA (US); Steven R. Vasquez, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 407 days.

(21) Appl. No.: 12/471,104

(22) Filed: May 22, 2009

(51) Int. Cl.
*G06F 13/00* (2006.01)
(52) U.S. Cl. ......... 711/111; 711/112; 711/170; 711/173
(58) Field of Classification Search .................. 711/111, 711/112, 170, 173
See application file for complete search history.

(56) References Cited

U.S. PATENT DOCUMENTS

| | | | |
|---|---|---|---|
| 5,119,250 A | 6/1992 | Green et al. | |
| 5,182,684 A | 1/1993 | Thomas et al. | |
| 5,220,653 A | 6/1993 | Miro | |
| 5,268,804 A | 12/1993 | Wallis | |
| 5,498,971 A | 3/1996 | Turnbull et al. | |
| 5,594,603 A | 1/1997 | Mori et al. | |
| 5,657,179 A | 8/1997 | McKenzie | |
| 5,729,718 A | 3/1998 | Au | |
| 5,760,563 A | 6/1998 | Bennett et al. | |
| 5,793,558 A | 8/1998 | Codilian et al. | |
| 5,845,318 A | 12/1998 | Rose et al. | |
| 5,991,825 A | 11/1999 | Ng | |
| 6,038,096 A | 3/2000 | Zhang et al. | |
| 6,115,205 A | 9/2000 | Waugh et al. | |
| 6,145,052 A | 11/2000 | Howe et al. | |
| 6,163,430 A | 12/2000 | Hansen | |
| 6,195,222 B1 | 2/2001 | Heminger et al. | |
| 6,272,565 B1 | 8/2001 | Lamberts | |
| 6,310,743 B1 | 10/2001 | Haines et al. | |
| 6,339,811 B1 | 1/2002 | Gaertner et al. | |
| 6,342,985 B1 | 1/2002 | Clare et al. | |
| 6,343,351 B1 | 1/2002 | Lackman et al. | |
| 6,369,972 B1 | 4/2002 | Codilian et al. | |
| 6,418,510 B1 | 7/2002 | Lamberts | |
| 6,445,531 B1 | 9/2002 | Gaertner et al. | |
| 6,515,819 B1 | 2/2003 | Schmidt et al. | |
| 6,604,178 B1 * | 8/2003 | Hall | 711/111 |
| 6,721,906 B1 | 4/2004 | Hirashita et al. | |
| 6,731,450 B1 | 5/2004 | Codilian et al. | |
| 6,744,590 B2 | 6/2004 | Chu et al. | |
| 6,754,035 B2 | 6/2004 | Francis et al. | |
| 6,754,036 B2 | 6/2004 | Dehnert | |
| 6,757,481 B1 | 6/2004 | Nazarian et al. | |
| 6,809,896 B2 | 10/2004 | Espeseth et al. | |

(Continued)

OTHER PUBLICATIONS

"Optimal Seek-Speed versus Power Tradeoff in Disk File Systems", IBM Technical Disclosure Bulletin, Jun. 1995, vol. #38, Pub #6, pp. 323-324.

*Primary Examiner* — Trong Phan (57) ABSTRACT

A disk drive is disclosed comprising a disk having a plurality of tracks, wherein each track comprises a plurality of data sectors. The disk drive further comprises a head actuated over the disk, and control circuitry fabricated on a die. A plurality of disk access commands are received from a host and stored in a command queue, wherein each disk access command identifies at least one data sector. A temperature of the die is determined, and a first disk access command is selected from the command queue in response to the die temperature.

24 Claims, 9 Drawing Sheets

U.S. PATENT DOCUMENTS

| | | | |
|---|---|---|---|
| 6,826,630 B2 | 11/2004 | Olds et al. | |
| 6,877,070 B2 | 4/2005 | Espeseth et al. | |
| 6,967,811 B1 | 11/2005 | Codilian et al. | |
| 6,968,422 B1 * | 11/2005 | Codilian et al. | 711/112 |
| 6,968,423 B2 | 11/2005 | Coker et al. | |
| 6,987,639 B1 * | 1/2006 | Yu | 711/112 |
| 6,993,624 B2 * | 1/2006 | Hall | 711/112 |
| 6,995,946 B2 | 2/2006 | Ding et al. | |
| 7,061,714 B1 * | 6/2006 | Yu | 711/111 |
| 7,114,029 B1 * | 9/2006 | Thelin | 711/112 |
| 7,129,763 B1 | 10/2006 | Bennett et al. | |
| 7,432,729 B2 | 10/2008 | Noel et al. | |
| 7,450,334 B1 * | 11/2008 | Wang et al. | 711/112 |
| 7,471,486 B1 * | 12/2008 | Coker et al. | 711/112 |
| 7,945,727 B2 * | 5/2011 | Rothberg et al. | 711/112 |
| 2002/0131195 A1 | 9/2002 | Dehnert | |
| 2002/0173858 A1 | 11/2002 | Sherlock | |
| 2003/0048571 A1 | 3/2003 | Soyama et al. | |
| 2003/0056059 A1 | 3/2003 | Fox et al. | |
| 2003/0149837 A1 | 8/2003 | Coker et al. | |
| 2003/0188092 A1 | 10/2003 | Heath et al. | |
| 2004/0233569 A1 | 11/2004 | Chung | |
| 2005/0055517 A1 | 3/2005 | Olds et al. | |
| 2006/0007591 A1 | 1/2006 | Park et al. | |

* cited by examiner

DISK DRIVE ADJUSTING COMMAND EXECUTION IN RESPONSE TO CONTROL CIRCUITRY DIE TEMPERATURE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
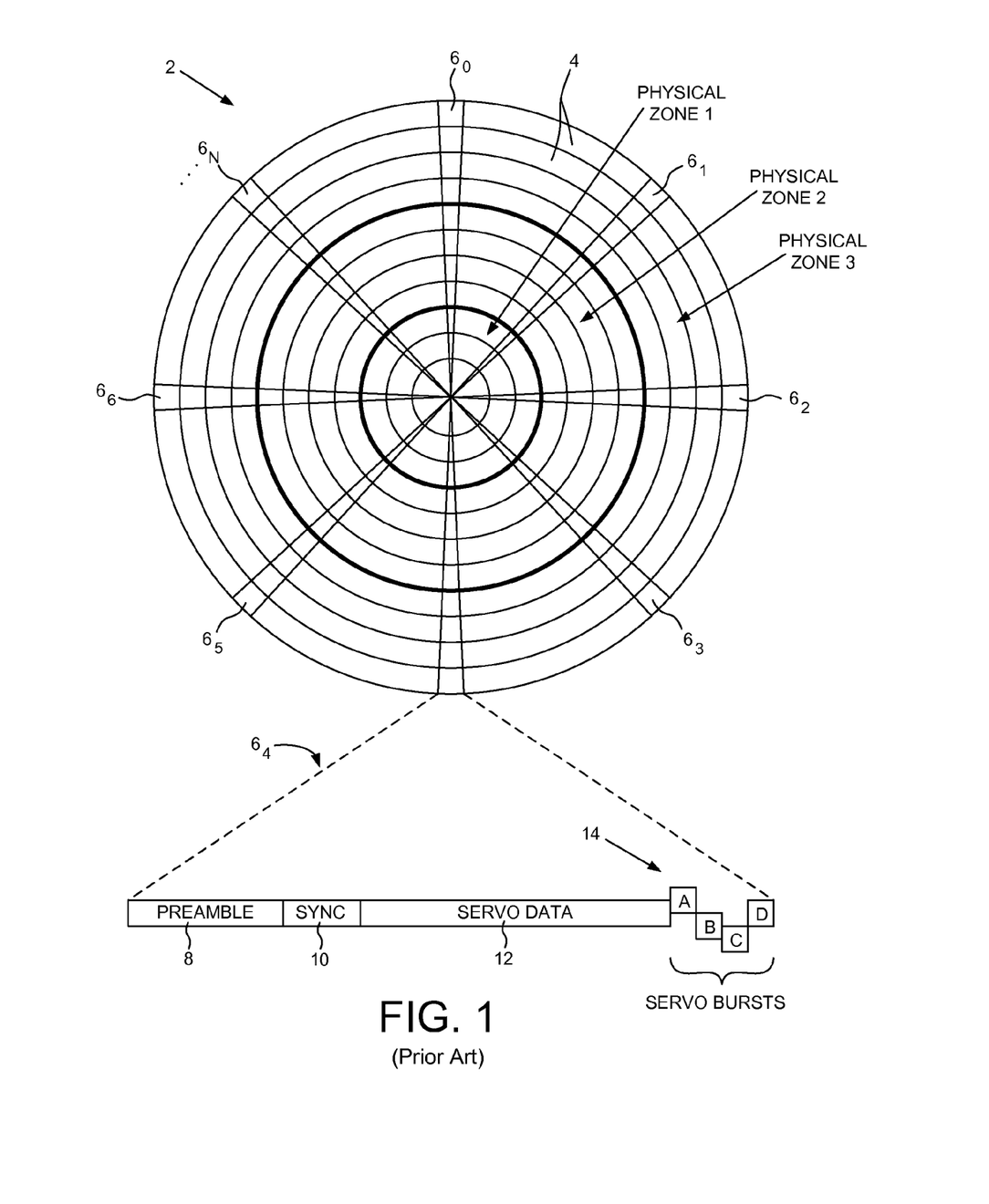
FIG. 1 shows a prior art disk format comprising a plurality of data tracks defined by embedded servo sectors.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of tracks 4, wherein the tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target track during a seek operation. Each servo sector 6, further comprises groups of servo bursts 14 (e.g., A, B, C and D bursts), which comprise a number of consecutive transitions recorded at precise intervals and offsets with respect to a track centerline. The groups of servo bursts 14 provide fine head position information used for centerline tracking while accessing a track during write/read operations.

DETAILED DESCRIPTION OF EMBODIMENTS OF THE INVENTION

Figure 2A:
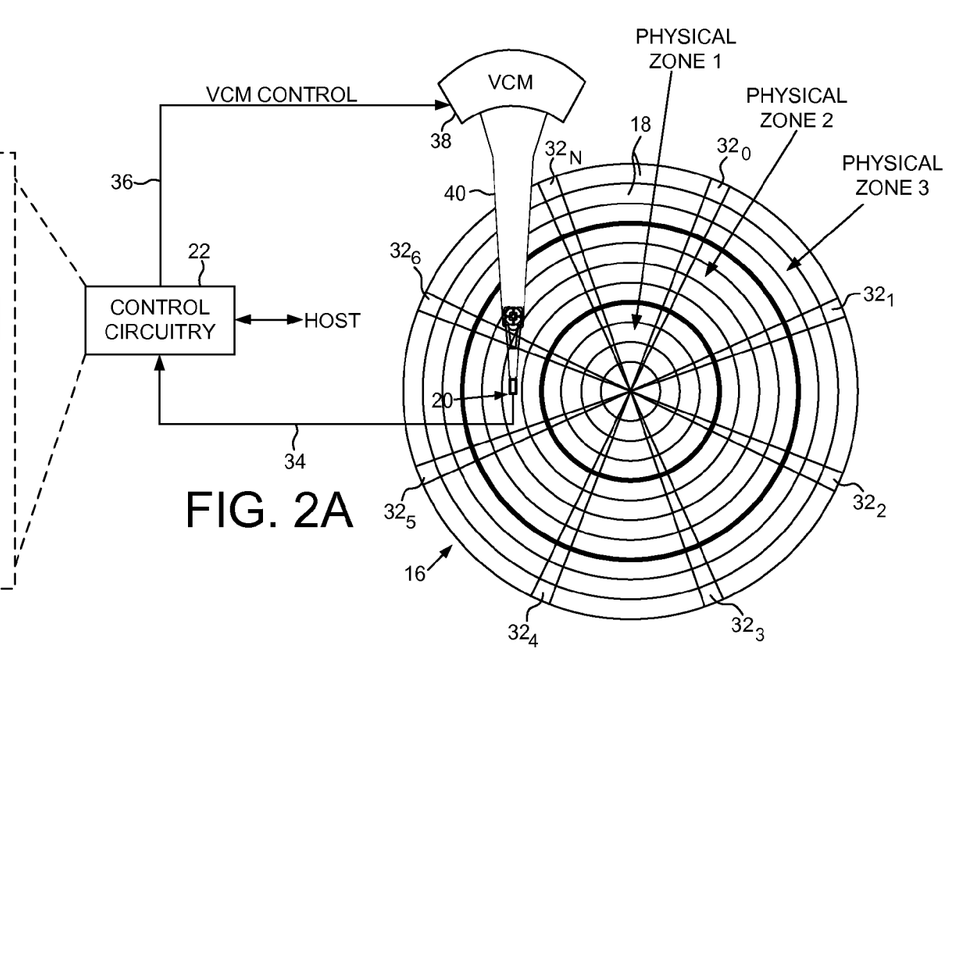
FIG. 2A shows a disk drive according to an embodiment of the present invention comprising a disk, a head actuated over the disk, and control circuitry fabricated on a die.
Figure 2B:
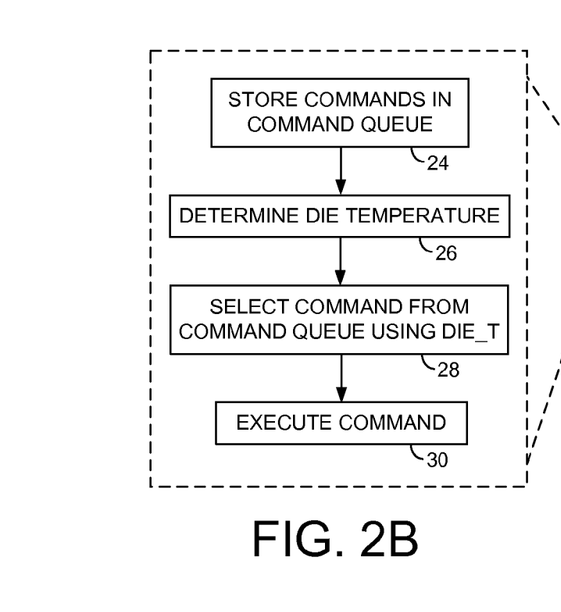
FIG. 2B is a flow diagram executed by the control circuitry according to an embodiment of the present invention wherein a disk access command is selected from a command queue based on the die temperature.

FIG. 2A shows a disk drive according to an embodiment of the present invention comprising a disk 16 having a plurality of tracks 18, wherein each track comprises a plurality of data sectors. The disk drive further comprises a head 20 actuated over the disk 16, and control circuitry 22 fabricated on a die. The control circuitry 22 executes the flow diagram of FIG. 2B wherein a plurality of disk access commands are received from a host and stored in a command queue (step 24), wherein each disk access command identifies at least one data sector. A temperature of the die is determined (step 26), and a first disk access command is selected from the command queue in response to the die temperature (step 28). The selected command is then executed (step 30).

In the embodiment of FIG. 2A, the tracks 18 are defined by a plurality of servo sectors $32_0$-$32_N$. The control circuitry 22 processes a read signal 34 to demodulate the servo sectors $32_0$-$32_N$ into a position error signal (PES). The PES is filtered with a suitable compensation filter to generate a control signal 36 applied to a voice coil motor (VCM) 38 which rotates an actuator arm 40 about a pivot in order to position the head 20 radially over the disk 16 in a direction that reduces the PES. The servo sectors $32_0$-$32_N$ may comprise any suitable position information, such as a track address for coarse positioning and servo bursts for fine positioning. Also in the embodiment of FIG. 2A, the tracks 18 are banded together to form a plurality of physical zones, wherein the data rate of the data sectors within each zone is constant across a zone, and increases from the inner diameter zones toward the outer diameter zones.

Figure 3A:
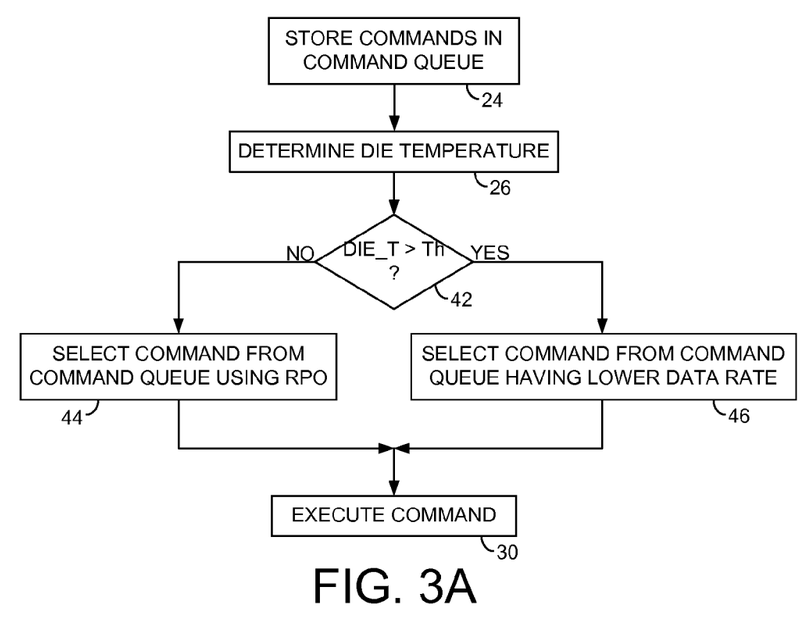
FIGS. 3A and 3B illustrate an embodiment of the present invention wherein a disk access command is selected from the command queue based on the data rate of the corresponding zone.
Figure 3B:
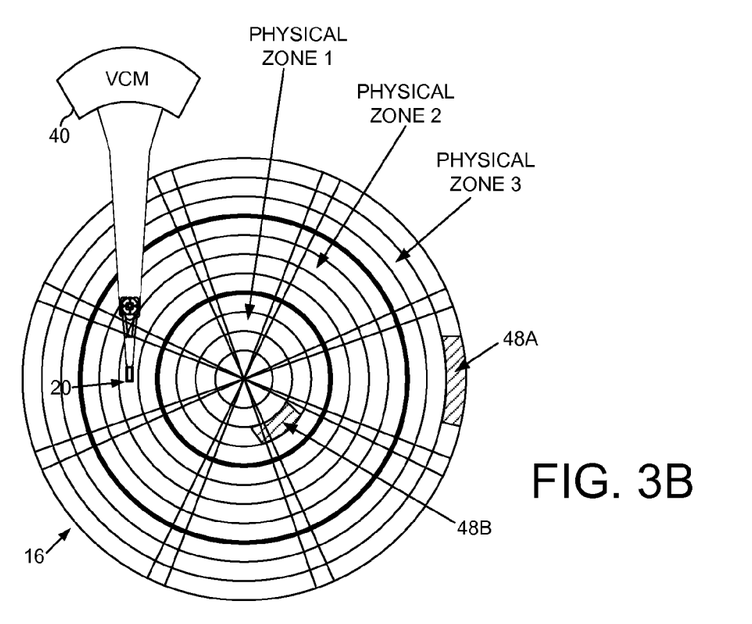

FIG. 3A is a flow diagram according to an embodiment of the present invention wherein when the die temperature does not exceed a threshold (step 42), a next disk access command is selected from the command queue based on a rotational position optimization (RPO) algorithm (step 44). However, when the die temperature exceeds the threshold (step 42), a next disk access command is selected from the command queue based on the data rate of the corresponding zone (step 46). FIG. 3B shows an example of this embodiment wherein a first disk access command identifying data sectors 48A may be selected using the RPO algorithm when the die temperature does not exceed the threshold, whereas a second disk access command identifying data sectors 48B having a lower data rate may be selected when the die temperature exceeds the threshold. Executing a disk access command having lower data rate data sectors allows the die to cool since the clocking frequency of the control circuitry is lower. In one embodiment, the higher the die temperature, the lower the acceptable data rate. In the embodiment of FIG. 3B, a first die temperature may allow disk access commands to be selected from physical zones 1 or 2, whereas a second (higher) die temperature may allow disk access commands to be selected only from physical zone 1.

In one embodiment, the RPO algorithm may be used to select the next disk access command after restricting the allowed disk access commands based on the die temperature. For example, if the die temperature restricts the selection to physical zone 1, the RPO algorithm may be executed to select the disk access command out of those that correspond to physical zone 1.

Figure 4A:
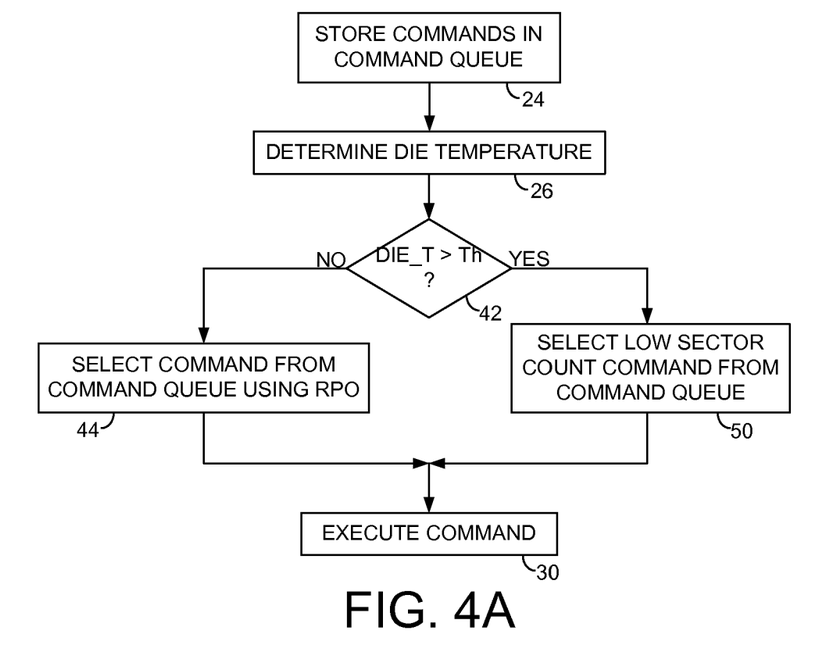
FIGS. 4A and 4B illustrate an embodiment of the present invention wherein a disk access command is selected from the command queue based on a number of data sectors in the disk access command.
Figure 4B:
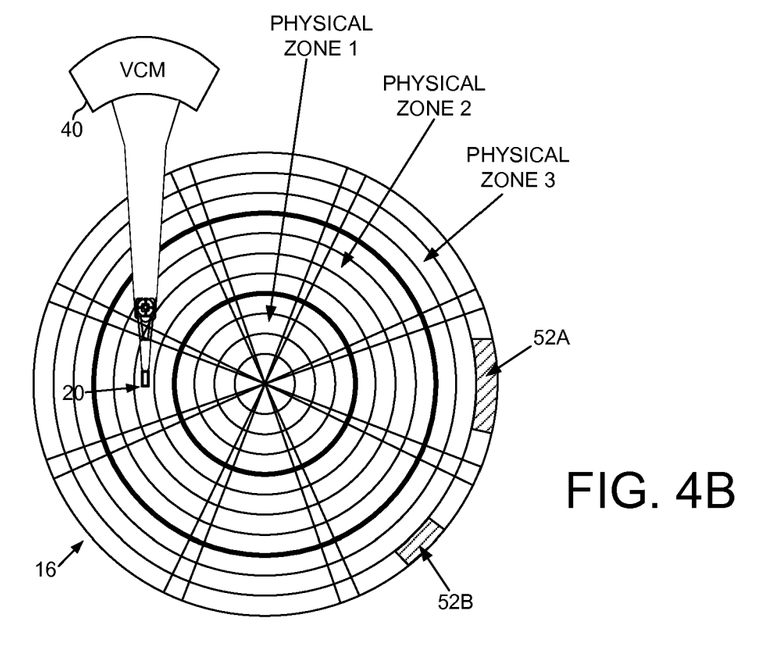

FIG. 4A is a flow diagram according to an embodiment of the present invention wherein when the die temperature exceeds the threshold (step 42), a next disk access command is selected from the command queue based on the number of data sectors identified by each disk access command (step 50). FIG. 4B shows an example of this embodiment wherein a first disk access command identifying data sectors 52A may be selected using the RPO algorithm when the die temperature does not exceed the threshold, whereas a second disk access command identifying fewer data sectors 52B may be selected when the die temperature exceeds the threshold. Executing a disk access command having fewer data sectors allows the die to cool between execution of the disk access commands. In one embodiment described in greater detail below, the higher the die temperature, the fewer the number of allowed data sectors per disk access command.

Figure 5A:
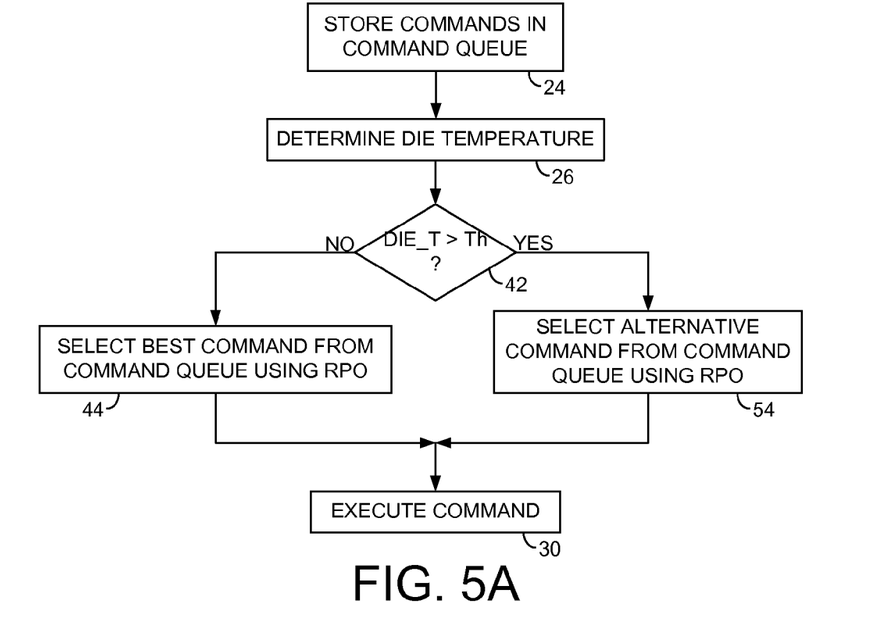
FIGS. 5A and 5B illustrate an embodiment of the present invention wherein a disk access command is selected from the command queue based on an access latency that will allow the die temperature to cool.
Figure 5B:
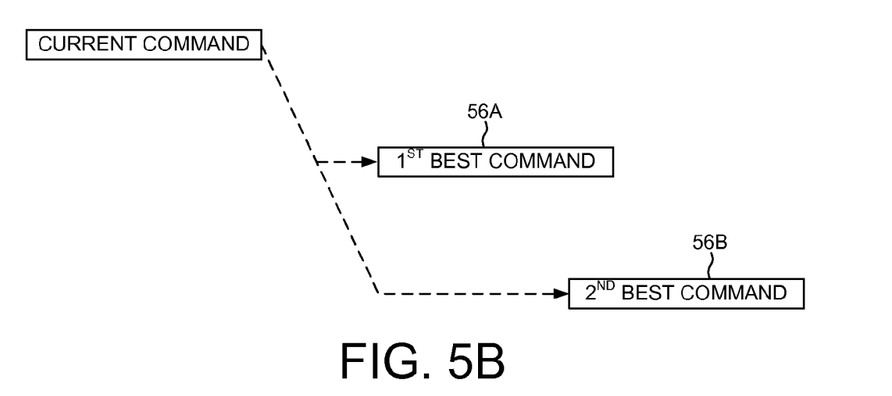

FIG. 5A is a flow diagram according to an embodiment of the present invention wherein when the die temperature exceeds the threshold (step 42), a next disk access command is selected from the command queue using the RPO algorithm (step 54). FIG. 5B shows an example of this embodiment wherein the RPO algorithm may identify a first disk access command 56A when the die temperature does not exceed the threshold, and identify a second (next best) disk access command 56B when the die temperature exceeds the threshold. The second disk access command 56B has a higher access latency (seek and rotational latency) which allows the die to cool between execution of the disk access commands. In one embodiment, the RPO algorithm may continue to select the next best disk access command until the access latency ensures the die temperature will cool sufficiently.

Figure 6:
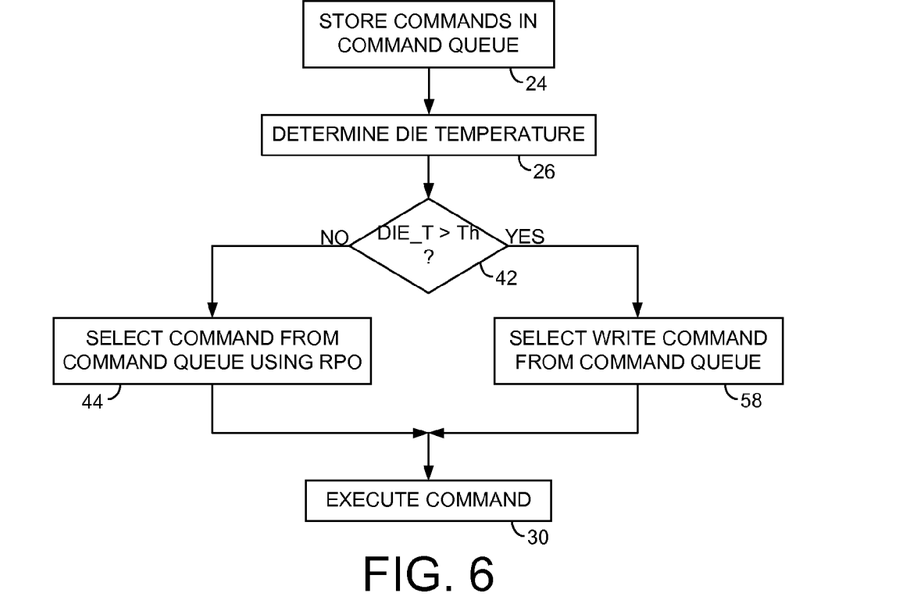
FIG. 6 is a flow diagram according to an embodiment of the present invention wherein a write command is selected from the command queue when the die temperature exceeds a threshold.

FIG. 6 is a flow diagram according to an embodiment of the present invention wherein when the die temperature exceeds the threshold (step 42), a write command is selected from the command queue (step 58). In this embodiment, a write command may require less power to execute since the components of the read channel for processing a read command would be idle or shut off. In one embodiment, the write commands in the command queue are selected for processing over read commands until the die temperature falls below the threshold (step 42).

Figure 7:
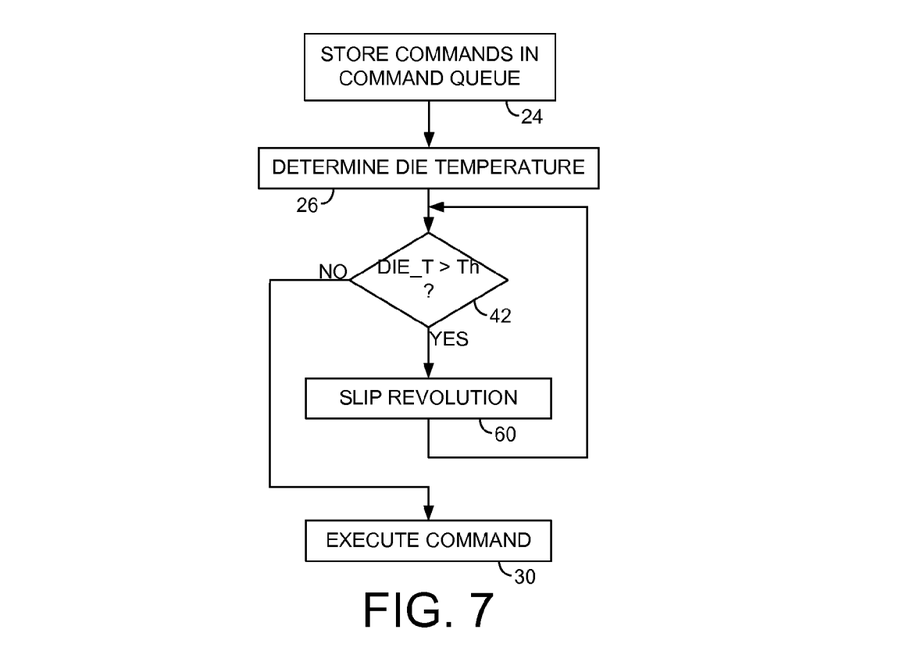
FIG. 7 is a flow diagram according to an embodiment of the present invention wherein a revolution is slipped before executing the next disk access command to allow the die temperature to cool.

FIG. 7 is a flow diagram according to an embodiment of the present invention wherein when the die temperature exceeds the threshold (step 42), the control circuitry slips a revolution of the disk (step 60) before executing the next disk access command. Slipping a revolution of the disk allows the die to cool down before executing the disk access command. In one embodiment, the die temperature is determined just prior to executing the disk access command after performing the seek operation and settling on the target track.

Figure 8:
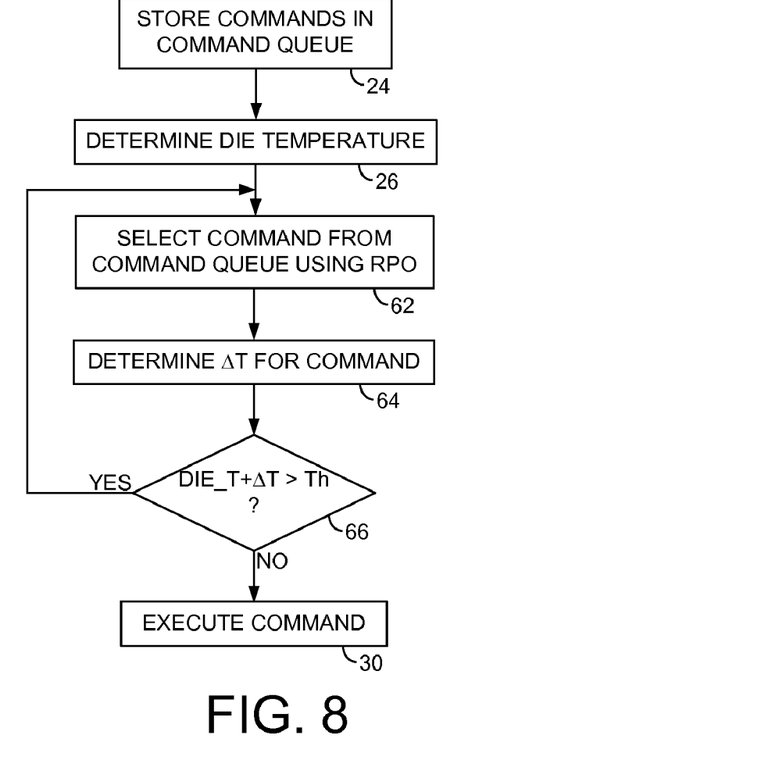
FIG. 8 is a flow diagram according to an embodiment of the present invention wherein a delta temperature is computed for each disk access command selected from the command queue and the selected command executed if the current die temperature plus the delta temperature does not exceed a threshold.

FIG. 8 is a flow diagram according to an embodiment of the present invention wherein after selecting a disk access command from the command queue using the RPO algorithm (step 62), a delta temperature is determined for the selected command (step 64). The delta temperature represents the corresponding rise in the die temperature if the disk access command is actually executed. In one embodiment, the delta temperature is determined based on the number of data sectors identified by the disk access command. If the current die temperature plus the delta temperature exceeds a threshold (step 66), a next best disk access command is selected from the command queue and a corresponding delta temperature determined.

Figure 9:
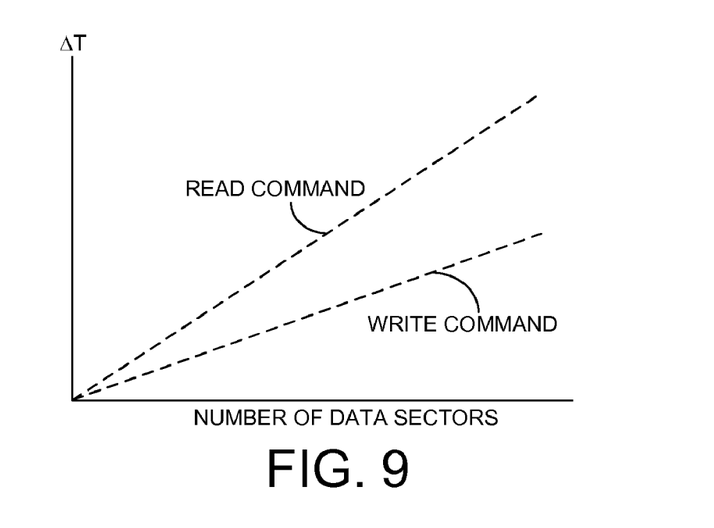
FIG. 9 shows an embodiment of the present invention wherein the delta temperature is a function of the number of data sectors and depending on whether the disk access command is a read or write command.

FIG. 9 shows an embodiment of the present invention wherein the relationship between the number of data sectors and the corresponding delta temperature is a linear relationship. Also in the embodiment of FIG. 9, the slope of the line for read commands is steeper than the slope of the line for write commands since read commands may require more power to execute as described above.

Figure 10:
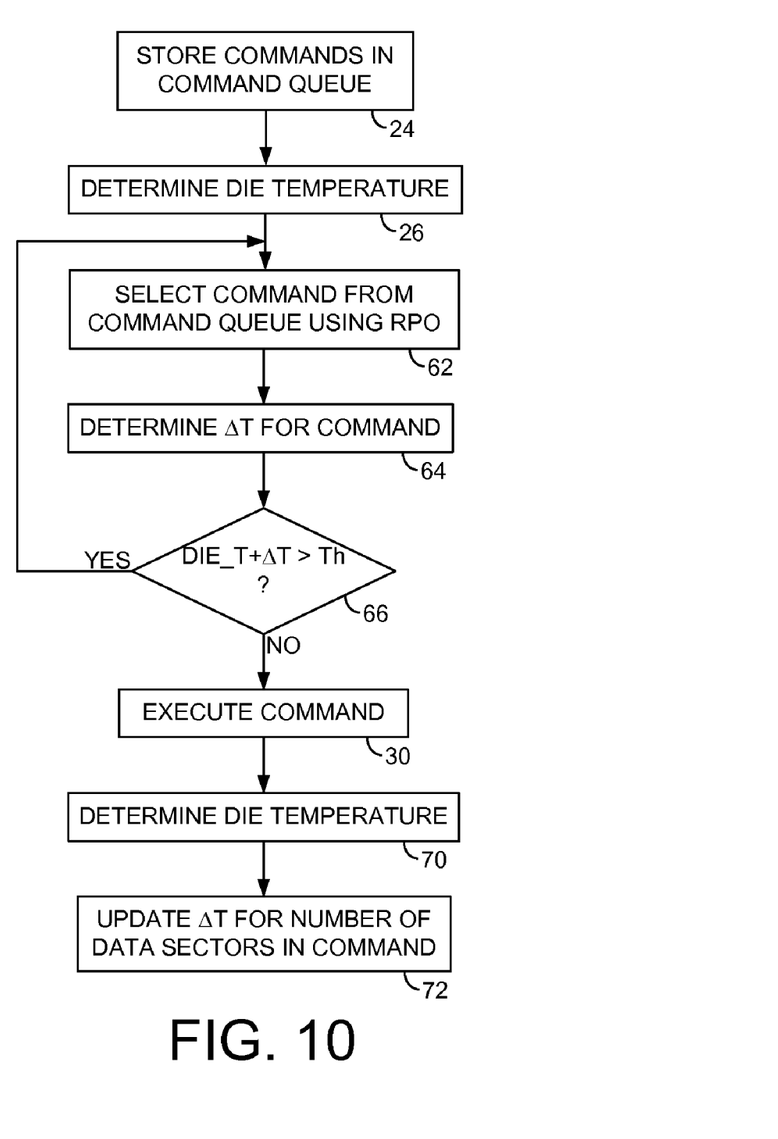
FIG. 10 is a flow diagram according to an embodiment of the present invention wherein the delta temperature is updated after executing a disk access command.

FIG. 10 is a flow diagram according to an embodiment of the present invention wherein the control circuitry determines the die temperature (step 70) after executing the selected disk access command, and then updates the corresponding delta temperature for the number of data sectors just processed (step 72). In other words, the relationship between the delta temperature versus the number of data sectors (e.g., as shown in FIG. 9) is continuously updated since it may change over the life of the disk drive, and/or over varying environmental conditions. In one embodiment, the relationship over the entire range of data sectors is updated, for example, by adjusting the slope of the line shown in FIG. 9 after executing a single disk access command identifying a particular number of data sectors. In yet another embodiment, a number of data points may be determined and then the relationship updated by curve fitting through the data points.

Figure 11:
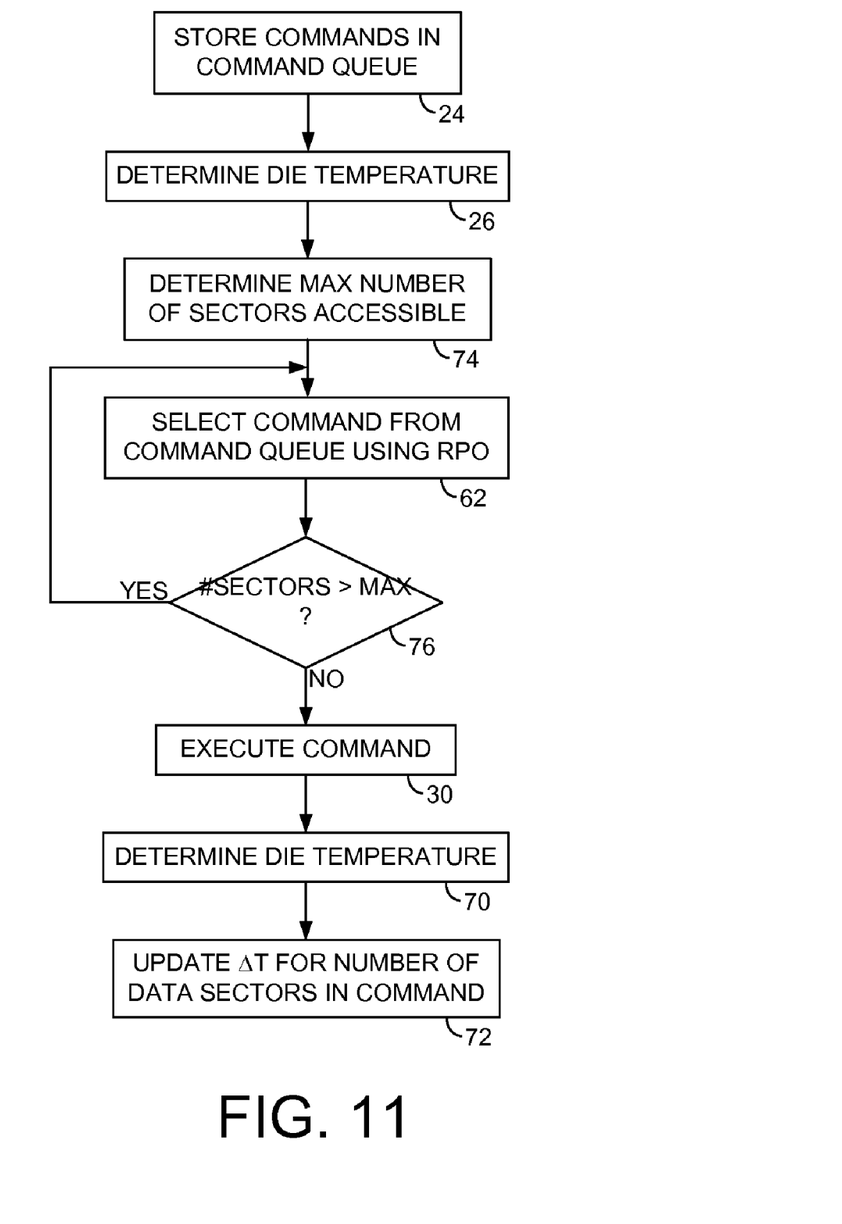
FIG. 11 is a flow diagram according to an embodiment of the present invention wherein a maximum number of accessible data sectors is determined, and then the next disk access command selected based on this maximum.

FIG. 11 is a flow diagram according to an embodiment of the present invention wherein after determining the die temperature (step 26) a maximum number of accessible data sectors is determined that will prevent the die temperature from exceeding a threshold (step 74). The next disk access command is then selected from the command queue using the RPO algorithm (step 62). If the number of data sectors identified by the selected disk access command exceeds the maximum accessible (step 76), then the next best disk access command is selected from the command queue. This process repeats until the selected disk access command identifies a number of data sectors that is less than the maximum accessible. In one embodiment, a different maximum number of accessible data sectors is determined for read commands and write commands, and the corresponding maximum at step 76 differs depending on whether the selected disk access command is a read command or write command.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, wherein each track comprises a plurality of data sectors;
   a head actuated over the disk; and
   control circuitry comprising a die, the control circuitry operable to:
      receive a plurality of disk access commands from a host, wherein each disk access command identifies at least one data sector;
      store the disk access commands in a command queue;
      determine a temperature of the die;
      select a first disk access command from the command queue in response to the die temperature; and
      execute the first disk access command.

2. The disk drive as recited in claim 1, wherein:
   the disk comprises a first zone and a second zone;
   the first zone comprises a plurality of tracks having data sectors recorded at a first data rate;
   the second zone comprises a plurality of data tracks having data sectors recorded at a second data rate less than the first data rate; and
   the first disk access command is selected from the command queue in response to the data rates of the zones and in response to the die temperature.

3. The disk drive as recited in claim 1, wherein the control circuitry is operable to select the first disk access command from the command queue using a rotation position optimization (RPO) algorithm and in response to the die temperature.

4. The disk drive as recited in claim 1, wherein the control circuitry is operable to select the first disk access command from the command queue in response to a number of data sectors identified by the first disk access command and in response to the die temperature.

5. The disk drive as recited in claim 4, wherein the control circuitry is further operable to:
   determine a delta temperature associated with a first number of data sectors identified by the first disk access command;
   execute the first disk access command when the die temperature plus the delta temperature does not exceed a threshold; and
   select a second disk access command from the command queue when the die temperature plus the delta temperature exceeds the threshold.

6. The disk drive as recited in claim 5, wherein the second disk access command identifies a second number of data sectors less than the first number of data sectors identified by the first disk access command.

7. The disk drive as recited in claim 5, wherein the first disk access command comprises a first access latency and the second disk access command comprises a second access latency greater than the first access latency.

8. The disk drive as recited in claim 5, wherein the control circuitry is further operable to determine a first delta temperature when the first disk access command is a read command and determine a second delta temperature when the first disk access command is a write command.

9. A disk drive comprising:
   a disk comprising a plurality of tracks, wherein each track comprises a plurality of data sectors;
   a head actuated over the disk; and
   control circuitry comprising a die, the control circuitry operable to:
      receive a disk access command from a host to access at least one of the data sectors;
      determine a temperature of the die; and
      when the die temperature exceeds a threshold, slip at least one revolution of the disk before executing the disk access command.

10. A disk drive comprising:
    a disk comprising a plurality of tracks, wherein each track comprises a plurality of data sectors;
    a head actuated over the disk; and
    control circuitry comprising a die, the control circuitry operable to:
       receive a first disk access command from a host to access a first number of the data sectors;
       determine a first temperature of the die prior to executing the first disk access command;
       execute the first disk access command;
       determine a second temperature of the die after executing the first disk access command; and
       update a delta temperature associated with the first number of data sectors in response to the first and second die temperatures.

11. The disk drive as recited in claim 10, wherein the control circuitry is further operable to:
    receive a plurality of disk access commands from the host including the first disk access command;
    store the disk access commands in a command queue;
    determine a temperature of the die;
    select the first disk access command from the command queue;
    determine the delta temperature associated with the first number of data sectors;
    execute the first disk access command when the die temperature plus the delta temperature does not exceed a threshold; and
    select a second disk access command from the command queue when the die temperature plus the delta temperature exceeds the threshold.

12. The disk drive as recited in claim 10, wherein the control circuitry is further operable to:
    receive a plurality of disk access commands from the host including the first disk access command;
    store the disk access commands in a command queue;
    determine a third temperature of the die;
    determine a maximum number of accessible data sectors in response to the third die temperature; and select the first disk access command from the command queue in response to the maximum number of accessible data sectors.

13. A method of operating a disk drive, the disk drive comprising a disk comprising a plurality of tracks, wherein each track comprises a plurality of data sectors, a head actuated over the disk, and control circuitry fabricated on a die, the method comprising:
   receiving a plurality of disk access commands from a host, wherein each disk access command identifies at least one data sector;
   storing the disk access commands in a command queue;
   determining a temperature of the die;
   selecting a first disk access command from the command queue in response to the die temperature; and
   executing the first disk access command.

14. The method as recited in claim 13, wherein:
   the disk comprises a first zone and a second zone;
   the first zone comprises a plurality of tracks having data sectors recorded at a first data rate;
   the second zone comprises a plurality of data tracks having data sectors recorded at a second data rate less than the first data rate; and
   the first disk access command is selected from the command queue in response to the data rates of the zones and in response to the die temperature.

15. The method as recited in claim 13, further comprising selecting the first disk access command from the command queue using a rotation position optimization (RPO) algorithm and in response to the die temperature.

16. The method as recited in claim 13, further comprising selecting the first disk access command from the command queue in response to a number of data sectors identified by the first disk access command and in response to the die temperature.

17. The method as recited in claim 16, further comprising:
   determining a delta temperature associated with a first number of data sectors identified by the first disk access command;
   executing the first disk access command when the die temperature plus the delta temperature does not exceed a threshold; and
   selecting a second disk access command from the command queue when the die temperature plus the delta temperature exceeds the threshold.

18. The method as recited in claim 17, wherein the second disk access command identifies a second number of data sectors less than the first number of data sectors identified by the first disk access command.

19. The method as recited in claim 17, wherein the first disk access command comprises a first access latency and the second disk access command comprises a second access latency greater than the first access latency.

20. The method as recited in claim 17, further comprising determining a first delta temperature when the first disk access command is a read command and determining a second delta temperature when the first disk access command is a write command.

21. A method of operating a disk drive, the disk drive comprising a disk comprising a plurality of tracks, wherein each track comprises a plurality of data sectors, a head actuated over the disk, and control circuitry fabricated on a die, the method comprising:
   receiving a disk access command from a host to access at least one of the data sectors;
   determining a temperature of the die; and
   when the die temperature exceeds a threshold, slipping at least one revolution of the disk before executing the disk access command.

22. A method of operating a disk drive, the disk drive comprising a disk comprising a plurality of tracks, wherein each track comprises a plurality of data sectors, a head actuated over the disk, and control circuitry fabricated on a die, the method comprising:
   receiving a first disk access command from a host to access a first number of the data sectors;
   determining a first temperature of the die prior to executing the first disk access command;
   executing the first disk access command;
   determining a second temperature of the die after executing the first disk access command; and
   updating a delta temperature associated with the first number of data sectors in response to the first and second die temperatures.

23. The method as recited in claim 22, further comprising:
   receiving a plurality of disk access commands from the host including the first disk access command;
   storing the disk access commands in a command queue;
   determining a temperature of the die;
   selecting the first disk access command from the command queue;
   determining the delta temperature associated with the first number of data sectors;
   executing the first disk access command when the die temperature plus the delta temperature does not exceed a threshold; and
   selecting a second disk access command from the command queue when the die temperature plus the delta temperature exceeds the threshold.

24. The method as recited in claim 22, further comprising:
   receiving a plurality of disk access commands from the host including the first disk access command;
   storing the disk access commands in a command queue;
   determining a third temperature of the die;
   determining a maximum number of accessible data sectors in response to the third die temperature; and
   selecting the first disk access command from the command queue in response to the maximum number of accessible data sectors.

* * * * *